United States Patent
Jo et al.

(10) Patent No.: US 11,608,401 B2
(45) Date of Patent: Mar. 21, 2023

(54) THERMOPLASTIC RESIN COMPOSITION

(71) Applicant: LG CHEM, LTD., Seoul (KR)

(72) Inventors: Joon Hwi Jo, Daejeon (KR); Seong Lyong Kim, Daejeon (KR); Dae Woo Lee, Daejeon (KR); Jae Bum Seo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 149 days.

(21) Appl. No.: 17/054,459

(22) PCT Filed: Oct. 29, 2019

(86) PCT No.: PCT/KR2019/014351
§ 371 (c)(1),
(2) Date: Nov. 10, 2020

(87) PCT Pub. No.: WO2020/091371
PCT Pub. Date: May 7, 2020

(65) Prior Publication Data
US 2021/0230333 A1    Jul. 29, 2021

(30) Foreign Application Priority Data

Oct. 31, 2018  (KR) .................. 10-2018-0132192
Oct. 28, 2019  (KR) .................. 10-2019-0134501

(51) Int. Cl.
C08F 265/06 (2006.01)
C08F 257/02 (2006.01)
C08F 267/08 (2006.01)
C08L 51/00 (2006.01)

(52) U.S. Cl.
CPC .......... *C08F 265/06* (2013.01); *C08F 257/02* (2013.01); *C08F 267/08* (2013.01); *C08L 51/003* (2013.01)

(58) Field of Classification Search
CPC ............................... C08L 51/003; C08L 51/04
See application file for complete search history.

(56) References Cited

U.S. PATENT DOCUMENTS

| | | | |
|---|---|---|---|
| 5,283,286 A | 2/1994 | Takahashi et al. | |
| 5,741,860 A | 4/1998 | Matsumoto | |
| 2003/0236350 A1 | 12/2003 | Berzinis | |
| 2004/0225034 A1 | 11/2004 | Berzinis | |
| 2004/0225069 A1 | 11/2004 | Berzinis | |
| 2006/0069210 A1* | 3/2006 | Berzinis ............. | C08F 265/04 525/242 |
| 2006/0148992 A1 | 7/2006 | Kim | |
| 2006/0252883 A1 | 11/2006 | Berzinis | |
| 2008/0242779 A1 | 10/2008 | Gaggar et al. | |
| 2009/0099297 A1 | 4/2009 | Huijs | |
| 2010/0160190 A1 | 6/2010 | Kuvshinnikova et al. | |
| 2014/0187704 A1 | 7/2014 | Kwon | |
| 2014/0187719 A1 | 7/2014 | Kim et al. | |
| 2014/0235749 A1 | 8/2014 | Kim | |
| 2015/0005435 A1 | 1/2015 | Park et al. | |
| 2015/0065652 A1 | 3/2015 | Kim | |
| 2016/0002455 A1 | 1/2016 | Chung | |
| 2016/0060446 A1 | 3/2016 | Park et al. | |
| 2017/0121519 A1 | 5/2017 | Park et al. | |
| 2018/0037730 A1 | 2/2018 | Lee et al. | |
| 2018/0230301 A1 | 8/2018 | Choi | |
| 2019/0023892 A1 | 1/2019 | Kang et al. | |

FOREIGN PATENT DOCUMENTS

| | | |
|---|---|---|
| CN | 1668693 A | 9/2005 |
| CN | 1784446 A | 6/2006 |
| CN | 103764700 A | 4/2014 |
| CN | 103910967 A | 7/2014 |
| CN | 104419191 A | 3/2015 |
| CN | 104603198 A | 5/2015 |
| CN | 106715575 A | 5/2017 |
| EP | 0514071 A1 | 11/1992 |
| JP | 355-112252 A | 8/1980 |
| JP | S60-208352 A | 10/1985 |
| JP | 405-105795 A | 4/1993 |
| JP | H08-27336 A | 1/1996 |
| JP | 2001253990 A | 9/2001 |
| JP | 2002-338777 A | 11/2002 |
| JP | 2006241283 A | 9/2006 |
| JP | 2012-512946 A | 6/2012 |
| KR | 10-2006-0016165 A | 2/2006 |
| KR | 10-2008-0035214 A | 4/2008 |
| KR | 10-2012-0072972 A | 7/2012 |
| KR | 10-2014-0005510 A | 1/2014 |
| KR | 10-2014-0092735 A | 7/2014 |
| KR | 10-2017-0025900 A | 3/2017 |
| KR | 2017-0090765 A | 8/2017 |
| KR | 10-2018-0050595 A | 5/2018 |
| KR | 10-2018-0076637 A | 7/2018 |
| WO | WO2013077492 A1 | 5/2013 |

* cited by examiner

OTHER PUBLICATIONS

Extended European Search Report for Application No. 19878064.5, dated Oct. 27, 2021.

*Primary Examiner* — Jeffrey C Mullis

(57) ABSTRACT

Provided is a thermoplastic resin composition which includes: a first graft copolymer including a $C_4$ to $C_{10}$ alkyl (meth)acrylate-based monomer unit, an aromatic vinyl-based monomer unit, and a vinyl cyan-based monomer unit; a second graft copolymer including a $C_4$ to $C_{10}$ alkyl (meth)acrylate-based monomer unit, an aromatic vinyl-based monomer unit, and a vinyl cyan-based monomer unit; and a first styrene-based copolymer being a copolymer of a monomer mixture including a $C_1$ to $C_3$ alkyl-substituted styrene-based monomer, a vinyl cyan-based monomer, and a $C_1$ to $C_3$ alkyl (meth)acrylate-based monomer, wherein the first graft copolymer and the second graft copolymer have cores having mutually different average particle diameters. The thermoplastic resin composition is excellent in colorability, weather resistance, tensile strength, flexural strength, and impact strength.

8 Claims, No Drawings

THERMOPLASTIC RESIN COMPOSITION

CROSS-REFERENCE TO RELATED APPLICATION

The present application is a National Phase entry of International Application No. PCT/KR2019/014351, which claims priority to and the benefit of Korean Patent Application No. 10-2018-0132192, filed on Oct. 31, 2018, and Korean Patent Application No. 10-2019-0134501, filed on Oct. 28, 2019, the disclosures of which are incorporated herein by reference in their entirety.

TECHNICAL FIELD

The present invention relates to a thermoplastic resin composition, specifically, a thermoplastic resin composition excellent in colorability, weather resistance, tensile strength, flexural strength, and impact strength.

BACKGROUND ART

A thermoplastic resin composition including a diene-based graft copolymer formed by graft polymerization of a diene-based rubber polymer with an aromatic vinyl-based monomer and a vinyl cyan-based monomer has been used in various fields such as electrical, electronic, construction, and automotive fields due to its excellent impact resistance, excellent rigidity, excellent chemical resistance, and excellent processability. However, the thermoplastic resin composition is not suitable for outdoor materials due to its poor weather resistance.

Accordingly, a thermoplastic resin composition, which exhibits excellent weather resistance and excellent aging resistance and includes an acrylic-based graft copolymer formed by graft polymerization of an acrylic-based rubber polymer with an aromatic vinyl-based monomer and a vinyl cyan-based monomer, has attracted great attention as an alternative. However, the thermoplastic resin composition including an acrylic-based graft copolymer is not easily applicable to a product requiring high quality due to its poor colorability.

Therefore, research is continuing on the development of a thermoplastic resin composition exhibiting excellent colorability as well as excellent weather resistance.

DISCLOSURE

Technical Problem

The present invention is directed to providing a thermoplastic resin composition excellent in weather resistance, colorability, tensile strength, flexural strength, and impact strength.

Technical Solution

One aspect of the present invention provides a thermoplastic resin composition which includes: a first graft copolymer including a $C_4$ to $C_{10}$ alkyl (meth)acrylate-based monomer unit, an aromatic vinyl-based monomer unit, and a vinyl cyan-based monomer unit; a second graft copolymer including a $C_4$ to $C_{10}$ alkyl (meth)acrylate-based monomer unit, an aromatic vinyl-based monomer unit, and a vinyl cyan-based monomer unit; and a first styrene-based copolymer being a copolymer of a monomer mixture including a $C_1$ to $C_3$ alkyl-substituted styrene-based monomer, a vinyl cyan-based monomer, and a $C_1$ to $C_3$ alkyl (meth)acrylate-based monomer, wherein the first graft copolymer and the second graft copolymer have cores having mutually different average particle diameters.

Advantageous Effects

A thermoplastic resin composition according to the present invention exhibits significantly improved colorability and significantly improved weather resistance, and also is excellent in mechanical properties such as tensile strength, flexural strength, impact strength, and the like. Specifically, the thermoplastic resin composition according to the present invention can attain excellent colorability and excellent weather resistance without degradation of mechanical properties by using a first styrene-based copolymer which is a copolymer of a monomer mixture including a $C_1$ to $C_3$ alkyl-substituted styrene-based monomer, a vinyl cyan-based monomer, and a $C_1$ to $C_3$ alkyl (meth)acrylate-based monomer.

MODES OF THE INVENTION

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

In the present invention, the average particle diameter of first and second graft copolymers may be measured by a dynamic light scattering method, specifically, by using a Nicomp 380 instrument (manufactured by Nicomp).

In the specification, the average particle diameter may refer to an arithmetic average particle diameter in the particle size distribution as measured by a dynamic light scattering method, specifically, an average particle diameter measured in the scattering intensity distribution.

In the present invention, the degree of grafting for first and second graft copolymers may be calculated by the following equation.

Degree of grafting (%): Weight (g) of grafted monomers/Weight (g) of crosslinked polymer×100

Weight (g) of grafted monomers: Weight of insoluble substance (gel) obtained after 1 g of graft copolymer is dissolved in 30 g of acetone and centrifuged Weight (g) of crosslinked polymer: Weight of $C_4$ to $C_{10}$ alkyl (meth)acrylate-based monomer theoretically added in graft copolymer powder In the present invention, the weight-average molecular weights of a first styrene-based copolymer, a second styrene-based copolymer, and a (meth)acrylic polymer may be measured as a relative value with respect to a standard polystyrene (PS) sample by gel permeation chromatography (GPC) using tetrahydrofuran (THF) as an eluate.

In the present invention, the polymer should be understood to encompass both a homopolymer formed by polymerizing one type of a monomer and a copolymer formed by polymerizing at least two types of monomers.

1. Thermoplastic Resin Composition

A thermoplastic resin composition according to an embodiment of the present invention includes: 1) a first graft copolymer including a $C_4$ to $C_{10}$ alkyl (meth)acrylate-based monomer unit, an aromatic vinyl-based monomer unit, and a vinyl cyan-based monomer unit; 2) a second graft copolymer including a $C_4$ to $C_{10}$ alkyl (meth)acrylate-based monomer unit, an aromatic vinyl-based monomer unit, and a vinyl cyan-based monomer unit; and 3) a first styrene-based copolymer being a copolymer of a monomer mixture including a $C_1$ to $C_3$ alkyl-substituted styrene-based monomer, a vinyl cyan-based monomer, and a $C_1$ to $C_3$ alkyl (meth)acrylate-based monomer, wherein the first graft copolymer and the second graft copolymer have cores having mutually different average particle diameters.

Since the first graft copolymer and the second graft copolymer have cores having mutually different average particle diameters, the thermoplastic resin composition according to an embodiment of the present invention may attain both excellent weather resistance and excellent mechanical properties.

In addition, the thermoplastic resin composition according to an embodiment of the present invention may further include 4) a second styrene-based copolymer which is a copolymer of a monomer mixture including an aromatic vinyl-based monomer and a vinyl cyan-based monomer.

Additionally, the thermoplastic resin composition according to an embodiment of the present invention may further include 5) a (meth)acrylic polymer including a $C_1$ to $C_3$ alkyl (meth)acrylate-based monomer unit.

Hereinafter, each component of the thermoplastic resin composition according to an embodiment of the present invention will be described in detail.

1) First Graft Copolymer

The first graft copolymer includes a $C_4$ to $C_{10}$ alkyl (meth)acrylate-based monomer unit, an aromatic vinyl-based monomer unit, and a vinyl cyan-based monomer unit.

The first graft copolymer may impart excellent weather resistance, tensile strength, flexural strength, and impact strength to the thermoplastic resin composition. Specifically, the $C_4$ to $C_{10}$ alkyl (meth)acrylate-based monomer unit may impart excellent weather resistance to the thermoplastic resin composition. In addition, the average particle diameter of the first graft copolymer may affect the provision of excellent tensile strength, flexural strength, and impact strength to the thermoplastic resin composition.

The first graft copolymer may be a graft copolymer formed by graft polymerization of an acrylic rubber polymer, which is a crosslinked polymer of a $C_4$ to $C_{10}$ alkyl (meth)acrylate-based monomer, with an aromatic vinyl-based monomer and a vinyl cyan-based monomer.

Here, the acrylic rubber polymer may refer to a core.

The core of the first graft copolymer may have an average particle diameter of 350 to 600 nm, 370 to 550 nm, or 400 to 500 nm, with the range of 400 to 500 nm being preferred. When the above-described range is satisfied, the mechanical properties, such as tensile strength, flexural strength, impact strength, and the like, of the thermoplastic resin composition can be improved. In addition, the colorability of the thermoplastic resin composition can be significantly improved.

The $C_4$ to $C_{10}$ alkyl (meth)acrylate-based monomer unit may be a unit derived from one or more monomers selected from the group consisting of butyl (meth)acrylate, pentyl (meth)acrylate, hexyl (meth)acrylate, heptyl (meth)acrylate, octyl (meth)acrylate, 2-ethylhexyl (meth)acrylate, nonyl (meth)acrylate, isononyl (meth)acrylate, and decyl (meth)acrylate, with the unit derived from butyl acrylate being preferred.

The $C_4$ to $C_{10}$ alkyl (meth)acrylate-based monomer unit may be included at 30 to 70 wt % or 40 to 60 wt % with respect to the total weight of the first graft copolymer, with the range of 40 to 60 wt % being preferred. When the above-described range is satisfied, the weather resistance and mechanical properties of the first graft copolymer can be improved.

The aromatic vinyl-based monomer unit may be a unit derived from one or more monomers selected from the group consisting of styrene, α-methylstyrene, p-methylstyrene, and 2,4-dimethylstyrene, with the unit derived from styrene which is an alkyl-unsubstituted styrene-based monomer being preferred.

The aromatic vinyl-based monomer unit may be included at 5 to 25 wt % or 10 to 20 wt % with respect to the total weight of the first graft copolymer, with the range of 10 to 20 wt % being preferred. When the above-described range is satisfied, the processability of the first graft copolymer can be improved.

The vinyl cyan-based monomer unit may be a unit derived from one or more monomers selected from the group consisting of acrylonitrile, methacrylonitrile, and ethacrylonitrile, with the unit derived from acrylonitrile being preferred.

The vinyl cyan-based monomer unit may be included at 15 to 55 wt % or 25 to 45 wt % with respect to the total weight of the first graft copolymer, with the range of 25 to 45 wt % being preferred. When the above-described range is satisfied, the chemical resistance and rigidity of the first graft copolymer can be improved.

The first graft copolymer may have a degree of grafting of 10 to 50% or 20 to 40%, with the range of 20 to 40% being preferred. When the above-described range is satisfied, the mechanical properties, i.e., tensile strength, flexural strength, and impact strength, of the first graft copolymer can be improved.

The first graft copolymer may be included at 1 to 20 wt % or 5 to 15 wt % with respect to the total weight of the thermoplastic resin composition, with the range of 5 to 15 wt % being preferred. When the above-described range is satisfied, the thermoplastic resin composition can attain excellent mechanical properties.

2) Second Graft Copolymer

The second graft copolymer includes a $C_4$ to $C_{10}$ alkyl (meth)acrylate-based monomer unit, an aromatic vinyl-based monomer unit, and a vinyl cyan-based monomer unit.

The second graft copolymer may impart excellent weather resistance to the thermoplastic resin composition. Specifically, the $C_4$ to $C_{10}$ alkyl (meth)acrylate-based monomer unit and the above-described average particle diameter may affect the provision of excellent weather resistance to the thermoplastic resin composition.

The second graft copolymer may be a graft copolymer formed by graft polymerization of an acrylic rubber polymer, which is a crosslinked polymer of a $C_4$ to $C_{10}$ alkyl (meth)acrylate-based monomer, with an aromatic vinyl-based monomer and a vinyl cyan-based monomer.

Here, the acrylic rubber polymer may refer to a core.

The core of the second graft copolymer may have an average particle diameter of 30 to 200 nm or 50 to 150 nm, with the range of 30 to 200 nm being preferred. When the above-described range is satisfied, the specific surface area of the second graft copolymer is increased, and thus weather resistance can be significantly improved.

Types of the $C_4$ to $C_{10}$ alkyl (meth)acrylate-based monomer unit have been described above.

The $C_4$ to $C_{10}$ alkyl (meth)acrylate-based monomer unit may be included at 30 to 70 wt % or 40 to 60 wt % with respect to the total weight of the second graft copolymer, with the range of 40 to 60 wt % being preferred. When the above-described range is satisfied, the weather resistance and mechanical properties of the second graft copolymer can be improved.

Types of the aromatic vinyl-based monomer unit have been described above.

The aromatic vinyl-based monomer unit may be included at 5 to 25 wt % or 10 to 20 wt % with respect to the total weight of the second graft copolymer, with the range of 10 to 20 wt % being preferred. When the above-described range is satisfied, the processability of the second graft copolymer can be improved.

Types of the vinyl cyan-based monomer unit have been described above.

The vinyl cyan-based monomer unit may be included at 15 to 55 wt % or 25 to 45 wt % with respect to the total weight of the second graft copolymer, with the range of 25 to 45 wt % being preferred. When the above-described range is satisfied, the chemical resistance and rigidity of the second graft copolymer can be improved.

The second graft copolymer may have a degree of grafting of 10 to 50% or 20 to 40%, with the range of 20 to 40% being preferred. When the above-described range is satisfied, the mechanical properties, i.e., tensile strength, flexural strength, and impact strength, of the second graft copolymer can be improved.

The second graft copolymer may be included at 20 to 45 wt % or 25 to 40 wt % with respect to the total weight of the thermoplastic resin composition, with the range of 25 to 40 wt % being preferred. When the above-described range is satisfied, the thermoplastic resin composition can attain excellent weather resistance and colorability.

3) First Styrene-Based Copolymer

The first styrene-based copolymer is a copolymer of a monomer mixture including a $C_1$ to $C_3$ alkyl-substituted styrene-based monomer, a vinyl cyan-based monomer, and a $C_1$ to $C_3$ alkyl (meth)acrylate-based monomer.

The first styrene-based copolymer may impart remarkably excellent weather resistance, heat resistance, and colorability to the thermoplastic resin composition.

Specifically, the $C_1$ to $C_3$ alkyl-substituted styrene-based monomer added in the preparation of the first styrene-based copolymer may impart remarkably excellent weather resistance and heat resistance to the thermoplastic resin composition. In addition, the $C_1$ to $C_3$ alkyl (meth)acrylate-based monomer added in the preparation of the first styrene-based copolymer may impart remarkably excellent colorability to the thermoplastic resin composition.

The $C_1$ to $C_3$ alkyl-substituted styrene-based monomer may be one or more selected from the group consisting of α-methylstyrene, p-methylstyrene, and 2,4-dimethylstyrene, with α-methylstyrene being preferred.

The $C_1$ to $C_3$ alkyl-substituted styrene-based monomer may be included at 50 to 75 wt %, 55 to 70 wt %, or 60 to 65 wt % with respect to the total weight of the monomer mixture, with the range of 60 to 65 wt % being preferred. When the $C_1$ to $C_3$ alkyl-substituted styrene-based monomer is included within the above-described range, remarkably excellent weather resistance and heat resistance can be imparted to the thermoplastic resin composition.

Types of the vinyl cyan-based monomer have been described above.

The vinyl cyan-based monomer may be included at 15 to 40 wt %, 20 to 35 wt %, or 25 to 30 wt % with respect to the total weight of the monomer mixture, with the range of 25 to 30 wt % being preferred. When the vinyl cyan-based monomer is included within the above-described range, excellent chemical resistance and rigidity can be imparted to the thermoplastic resin composition.

The $C_1$ to $C_3$ alkyl (meth)acrylate-based monomer may be one or more selected from the group consisting of methyl (meth)acrylate, ethyl (meth)acrylate, and propyl (meth)acrylate, with methyl methacrylate being preferred.

The $C_1$ to $C_3$ alkyl (meth)acrylate-based monomer may be included at 1 to 20 wt %, 5 to 15 wt %, or 9 to 13 wt % with respect to the total weight of the monomer mixture, with the range of 9 to 13 wt % being preferred. When the $C_1$ to $C_3$ alkyl (meth)acrylate-based monomer is included within the above-described range, remarkably excellent colorability can be imparted to the thermoplastic resin composition without degradation of impact strength.

The first styrene-based copolymer may have a weight-average molecular weight of 80,000 to 105,000 g/mol, 85,000 to 100,000 g/mol, or 90,000 to 95,000 g/mol, with the range of 90,000 to 95,000 g/mol being preferred. When the above-described range is satisfied, the processability of the thermoplastic resin composition can be improved.

The first styrene-based copolymer may be included at 40 to 70 wt % or 45 to 65 wt % with respect to the total weight of the thermoplastic resin composition, with the range of 45 to 60 wt % being preferred. When the above-described range is satisfied, the thermoplastic resin composition can realize excellent weather resistance and colorability.

4) Second Styrene-Based Copolymer

The second styrene-based copolymer may be a copolymer of a monomer mixture including an aromatic vinyl-based monomer and a vinyl cyan-based monomer.

The second styrene-based copolymer may impart excellent processability, chemical resistance, rigidity, and heat resistance to the thermoplastic resin composition.

The monomer mixture may include the aromatic vinyl-based monomer and the vinyl cyan-based monomer in a weight ratio of 55:45 to 80:20 or 60:40 to 75:25, with the range of 60:40 to 75:25 being preferred. When the above-described range is satisfied, the processability, chemical resistance, rigidity, and heat resistance of the second styrene-based copolymer can be balanced.

Types of the aromatic vinyl-based monomer have been described above, and, among those listed, one or more selected from the group consisting of styrene and α-methylstyrene are preferred.

Types of the vinyl cyan-based monomer have been described above, and, among those listed, acrylonitrile is preferred.

The second styrene-based copolymer may be one or more selected from the group consisting of a styrene/acrylonitrile copolymer and an α-methylstyrene/acrylonitrile copolymer, and the styrene/acrylonitrile copolymer is preferred to improve the processability of the thermoplastic resin composition.

The second styrene-based copolymer may be included at 1 to 20 wt % or 5 to 15 wt % with respect to the total weight of the thermoplastic resin composition, with the range of 5 to 15 wt % being preferred. When the above-described range is satisfied, the processability of the thermoplastic resin composition can be improved.

5) (Meth)Acrylic Polymer

The (meth)acrylic polymer may include a $C_1$ to $C_3$ alkyl (meth)acrylate-based monomer unit.

The (meth)acrylic polymer may impart excellent weather resistance and colorability to the thermoplastic resin composition.

Types of the $C_1$ to $C_3$ alkyl (meth)acrylate-based monomer have been described above.

The (meth)acrylic polymer may have a weight-average molecular weight of 80,000 to 100,000 g/mol or 85,000 to 95,000 g/mol, with the range of 85,000 to 95,000 g/mol being preferred. When the above-described condition is satisfied, the colorability of the thermoplastic resin composition can be improved.

Meanwhile, the (meth)acrylic polymer may be a (meth)acrylic copolymer further including one or more selected from the group consisting of an aromatic vinyl-based monomer unit and a vinyl cyan-based monomer unit in addition to the $C_1$ to $C_3$ alkyl (meth)acrylate-based monomer unit.

In this case, the (meth)acrylic copolymer may be a copolymer of a monomer mixture including a $C_1$ to $C_3$ alkyl (meth)acrylate-based monomer and one or more selected from the group consisting of an aromatic vinyl-based monomer and a vinyl cyan-based monomer.

The monomer mixture may include one or more selected from the group consisting of an aromatic vinyl-based monomer and a vinyl cyan-based monomer in an amount of 30 to 55 parts by weight or 35 to 50 parts by weight with respect to 100 parts by weight of the $C_1$ to $C_3$ alkyl (meth)acrylate-based monomer, with the range of 35 to 55 parts by weight being preferred. When the above-described range is satisfied, compatibility with the first and second styrene-based copolymers can be improved.

The (meth)acrylic polymer may be included at 1 to 10 wt % or 2 to 7 wt % with respect to the total weight of the thermoplastic resin composition, with the range of 2 to 7 wt % being preferred. When the above-described range is satisfied, the weather resistance and colorability of the thermoplastic resin composition can be improved.

Hereinafter, exemplary embodiments of the present invention will be described in detail so that those of ordinary skill in the art can easily carry out the present invention. However, it should be understood that the present invention can be implemented in various forms, and that the exemplary embodiments are not intended to limit the present invention thereto.

Preparation Example 1

95 parts by weight of a monomer mixture including 60 wt % of α-methylstyrene, 30 wt % of acrylonitrile, and 10 wt % of methyl methacrylate was mixed with 5 parts by weight of toluene as a reaction solvent and 0.075 part by weight of 1,1-bis(t-butylperoxy)cyclohexane and 0.195 part by weight of polyether poly-t-butylperoxycarbonate as initiators to prepare a polymerization solution.

Polymerization was performed by continuously adding the polymerization solution to a reactor set at 110° C. The polymerization product thus produced was transferred to a devolatilizing vessel, and unreacted monomers and the reaction solvent were recovered and removed at a temperature of 235° C. and a pressure of 20.6 Torr, thereby preparing a heat-resistant styrene-based resin in pellet form.

Examples and Comparative Examples

The specifications of components used in Examples and Comparative Examples are as follows.

(A-1) First graft copolymer: SA927 (commercially available from LG Chem Ltd., a graft copolymer formed by graft polymerization of a butyl acrylate rubber polymer having an average particle diameter of 450 nm with styrene and acrylonitrile) was used.

(A-2) Second graft copolymer: SA100 (commercially available from LG Chem Ltd., a graft copolymer formed by graft polymerization of a butyl acrylate rubber polymer having an average particle diameter of 100 nm with styrene and acrylonitrile) was used.

(B) First styrene-based copolymer: The copolymer prepared in Preparation Example 1 was used.

(C) Second styrene-based copolymer:

(C-1) Heat-resistant SAN copolymer: 200UH (commercially available from LG Chem Ltd., α-methylstyrene/acrylonitrile copolymer) was used; and (C-2) SAN copolymer: 95RF (commercially available from LG Chem Ltd., styrene/acrylonitrile copolymer) was used.

(D) (Meth)acrylic polymer:

(D-1) Poly(methyl methacrylate): IH830 commercially available from LG PMMA was used; and (D-2) (Meth)acrylic copolymer: XT510 (commercially available from LG Chem Ltd., methyl methacrylate/styrene/acrylonitrile copolymer) was used.

The above-described components were mixed in contents shown in the following [Table 1] and stirred to prepare thermoplastic resin compositions.

Experimental Example 1

Each of the thermoplastic resin compositions of Examples and Comparative Examples was put into an extruder kneader (cylinder temperature: 240° C.) and then extruded to prepare pellets. A physical property of the pellet was evaluated by the method described below, and results thereof are shown in the following [Table 1].

(1) Melt flow index (g/10 min, 220° C., 10 kg): measured in accordance with ISO 1133.

Experimental Example 2

The pellet prepared in Experimental Example 1 was injection-molded to prepare a specimen. Physical properties of the specimen were evaluated by methods described below, and results thereof are shown in the following [Table 1].

(2) Vicat Softening Temperature (° C.): measured in accordance with ISO 306.

(3) Tensile strength (MPa): measured in accordance with ISO 527.

(4) Flexural strength (MPa): measured in accordance with ISO 178.

(5) Charpy impact strength ($KJ/m^2$, Notched): measured in accordance with ISO 179.

(6) Colorability: determined by measuring the L value in a SCI mode using Color-Eye 7000A commercially available from GretagMacbeth.

(7) Weather resistance: tested according to PV3929 of the VW weather resistance standard using Ci4000 Weather-Ometer (manufactured by ATLAS). Weather resistance was evaluated by comparing the degree of discoloration of the specimen before and after the test based on the gray scale through visual inspection.

⊚: no discoloration of specimen after weather resistance test

○: slight discoloration of specimen after weather resistance test

Δ: significant discoloration of specimen after weather resistance test

TABLE 1

| Classification | Examples | | | | Comparative Examples | | | | |
|---|---|---|---|---|---|---|---|---|---|
| | 1 | 2 | 3 | 4 | 1 | 2 | 3 | 4 | 5 |
| (A-1) First graft copolymer (wt %) | 10 | 10 | 10 | 10 | 10 | 10 | 10 | 10 | 10 |
| (A-2) Second graft copolymer (wt %) | 30 | 30 | 30 | 30 | 30 | 30 | 30 | 30 | 30 |
| (B) First styrene-based copolymer (wt %) | 60 | 55 | 45 | 45 | — | — | — | — | — |
| (C) Second styrene-based copolymer (wt %) (C-1) | — | — | — | — | 60 | 55 | 45 | 45 | — |
| (C-2) | — | — | 10 | 10 | — | — | 10 | 10 | — |
| (D) (Meth)acrylic polymer (wt %) (D-1) | — | 5 | 5 | — | — | 5 | 5 | — | — |
| (D-2) | — | — | — | 5 | — | — | — | 5 | 60 |
| Melt flow index | 5 | 5 | 7 | 7 | 5 | 5 | 7 | 7 | 9 |
| Vicat Softening Temperature | 104 | 105 | 102 | 101 | 105 | 104 | 103 | 103 | 88 |
| Tensile strength | 50 | 50 | 48 | 48 | 49 | 49 | 48 | 49 | 46 |
| Flexural strength | 74 | 74 | 74 | 74 | 74 | 73 | 73 | 74 | 69 |
| Charpy impact strength | 11 | 11 | 10 | 10 | 11 | 11 | 10 | 10 | 9 |
| Colorability | 26.7 | 26.6 | 26.5 | 26.5 | 27.0 | 26.9 | 26.8 | 26.8 | 25.3 |
| Weather resistance | ◎ | ◎ | ◎ | ◎ | ◎ | ◎ | ○ | ○ | Δ |

(A-1) First graft copolymer: SA927 (commercially available from LG Chem Ltd., a graft copolymer formed by graft polymerization of a butyl acrylate rubber polymer having an average particle diameter of 450 nm with styrene and acrylonitrile)
(A-2) Second graft copolymer: SA100 (commercially available from LG Chem Ltd., a graft copolymer formed by graft polymerization of a butyl acrylate rubber polymer having an average particle diameter of 100 nm with styrene and acrylonitrile)
(B) First styrene-based copolymer: A copolymer of a monomer mixture including α-methylstyrene at 60 wt %, acrylonitrile at 30 wt %, and methyl methacrylate at 10 wt %
(C-1) Heat-resistant SAN copolymer: 200UH (commercially available from LG Chem Ltd., α-methylstyrene/acrylonitrile copolymer)
(C-2) SAN copolymer: 95RF (commercially available from LG Chem Ltd., styrene/acrylonitrile copolymer)
(C-3) MSAN copolymer: A copolymer of a monomer mixture including styrene at 60 wt %, acrylonitrile at 30 wt %, and methyl methacrylate at 10 wt %
(D-1) Poly(methyl methacrylate): IH830 commercially available from LG PMMA
(D-2) (Meth)acrylic copolymer: XT510 (commercially available from LG Chem Ltd., methyl methacrylate/styrene/acrylonitrile copolymer)

Referring to Table 1, it can be seen that Example 1 to Example 4 exhibited excellent colorability and excellent weather resistance while having excellent basic properties. In addition, when each of Example 1 and Comparative Example 1, Example 1 and Comparative Example 5, Example 2 and Comparative Example 2, Example 3 and Comparative Example 3, and Example 4 and Comparative Example 4 was compared, the L value differed by 0.3 or more, and thus it can be seen that especially colorability was significantly improved.

In addition, when each of Example 3 and Comparative Example 3 and Example 4 and Comparative Example 4 was compared, it can be seen that the effect of improving weather resistance as well as colorability was significant.

The invention claimed is:

1. A thermoplastic resin composition comprising:
   a first graft copolymer including a $C_4$ to $C_{10}$ alkyl (meth)acrylate-based monomer unit, an aromatic vinyl-based monomer unit, and a vinyl cyan-based monomer unit;
   a second graft copolymer including a $C_4$ to $C_{10}$ alkyl (meth)acrylate-based monomer unit, an aromatic vinyl-based monomer unit, and a vinyl cyan-based monomer unit; and
   a first styrene-based copolymer being a copolymer of a monomer mixture including a $C_1$ to $C_3$ alkyl-substituted styrene-based monomer, a vinyl cyan-based monomer, and a $C_1$ to $C_3$ alkyl (meth)acrylate-based monomer; and
   1 to 10 wt % of a (meth)acrylic polymer that includes a $C_1$ to $C_3$ alkyl (meth)acrylate-based monomer unit,
   wherein the first graft copolymer and the second graft copolymer have cores having mutually different average particle diameters.

2. The thermoplastic resin composition of claim 1, wherein the monomer mixture includes:
   the $C_1$ to $C_3$ alkyl-substituted styrene-based monomer at 50 to 75 wt %;
   the vinyl cyan-based monomer at 15 to 40 wt %; and
   the $C_1$ to $C_3$ alkyl (meth)acrylate-based monomer at 1 to 20 wt %.

3. The thermoplastic resin composition of claim 1, wherein the first graft copolymer has a core having an average particle diameter of 350 to 600 nm.

4. The thermoplastic resin composition of claim 1, wherein the second graft copolymer has a core having an average particle diameter of 30 to 200 nm.

5. The thermoplastic resin composition of claim 1, wherein each of the first graft copolymer and the second graft copolymer is an acrylonitrile/styrene/alkyl acrylate copolymer.

6. The thermoplastic resin composition of claim 1, which includes:
the first graft copolymer at 1 to 20 wt %;
the second graft copolymer at 20 to 45 wt %; and
the first styrene-based copolymer at 40 to 70 wt %.

7. The thermoplastic resin composition of claim 1, further comprising a second styrene-based copolymer,
wherein the second styrene-based copolymer is a copolymer of a monomer mixture including an aromatic vinyl-based monomer and a vinyl cyan-based monomer.

8. The thermoplastic resin composition of claim 7, which includes the second styrene-based copolymer at 1 to 20 wt %.

\* \* \* \* \*